Oct. 13, 1931.  E. E. GOLD  1,826,770

HOSE OR PIPE COUPLER

Filed May 20, 1927

INVENTOR:
Edward E. Gold,
By Attorneys,
Fraser, Myers & Manley.

Patented Oct. 13, 1931

1,826,770

UNITED STATES PATENT OFFICE

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK

HOSE OR PIPE COUPLER

Application filed May 20, 1927. Serial No. 192,848.

This invention relates to improvements in hose or pipe couplers of the type commonly used to detachably connect the hose ends or flexible end sections of the train pipes of railway cars.

It is an object of the invention to provide an improved key lock for such couplers which shall be more or less universal in use, whereby a coupler provided with the improved locking device may be coupled with any one of a number of similar standard couplers in common use and satisfactorily held in locked relation by the improved locking means even though the two couplers may vary somewhat as to dimensions and relative positions of the parts with which the locking element cooperates.

It is a further object of the invention to provide an improved coupler locking device of the wedge or key type, the relative parts of which shall be so formed and proportioned as to prevent the unintended separation of the wedge or key from the part of the coupler comprising the guide or key-way when the wedge or key is driven to its "release" position, thereby avoiding the loss of the key.

In the preferred form of the device herein disclosed for purposes of illustration:

Figure 1:
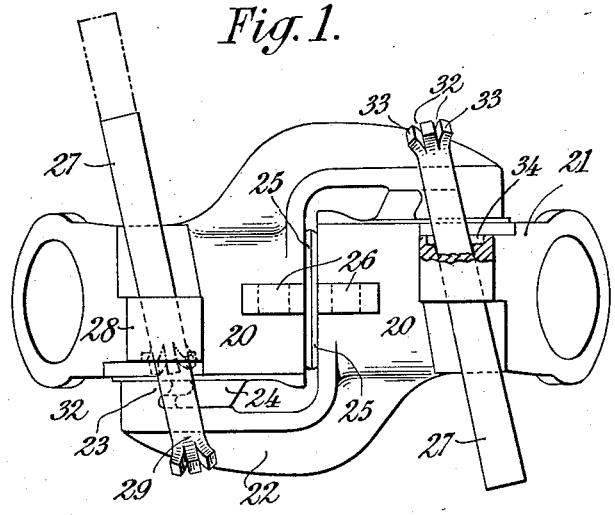
Figure 1 is a top view of a pair of couplers having the improved locking device of this invention applied thereto.

Each coupler of the form herein disclosed comprises a body or head portion 20, having a neck 21 by which it may be secured to the hose end or jointed end section of a train pipe, and a locking arm 22 having a cam-like overhanging flange 23 adapted for engagement with a cam-like flange 24 projecting outwardly from the side of a complementary coupler.

The adjacent end ports of the couplers, which are held in a state of close communication when they are in their interlocking relation, may be provided with gaskets 25 of any suitable type.

The couplers may be provided with perforated lugs 26 by means of which they may be suspended from the car end or other supporting structure when not in use.

Couplers of the type herein disclosed are coupled by bringing them together with their opposed ends inclined upwardly so that the flange of the arm 22 of each coupler is slightly above the flange of the adjacent projection 24 of the other coupler. The ends of the couplers are then lowered, each coupler being given a slight movement of rotation, the right-hand coupler in a counterclockwise direction and the left-hand coupler in a clockwise direction, thereby bringing the cam-like flanges of the arms 22 and projections 24 into an interlocking relation with the two gaskets held tightly against each other in positions of mutual registration.

The relative form and location of the cam-like flange on each arm 22 and on each projection 24 are such as to prevent further relative movement of the couplers when they attain their normal positions with the axes of their heads or body portions in alignment, in which position they are normally maintained by the force of gravity, unless uncoupled by lifting their ends and imparting rotational movements the reverse of those through which they are turned when being coupled.

Although, as above described, the force of gravity tends to maintain the couplers in their coupled relation, it has been found impracticable to depend altogether upon such natural agency, since the couplers may become accidentally uncoupled as a result of the swinging or swaying motions imparted to the hose ends when the cars to which they are attached are in motion. For this reason, various fastening means have been provided whereby the couplers may be positively locked in their coupled relations. One form of locking device which has been used for this purpose, as applied to couplers of the type herein selected for purposes of illustration, comprises a wedge or key 27 which may be driven through a key-way provided therefor in a boss or housing 28 so positioned that the end 29 of the key may extend over the end 22 of the locking arm of a complementary coupler. Although each coupler may be provided with such a wedge or key, a single locking device of the character described in one coupler, when driven to its effective position, satisfactorily locks the two couplers in their coupled relation and prevents unintentional disengagement.

Couplers and locking devices of the character thus far generally described are well known in the prior art (see for example, U. S. Patent No. 1,056,184, issued March 18, 1913, to Frederick T. Kitchen), and, of themselves, constitute no part of the invention to be protected, which will now be more particularly described.

It has been found as a result of experience that the insertion of the wedge or key 27 used on couplers of the above-described character is sometimes rendered quite difficult and is sometimes absolutely prevented if the upper surface of the locking arm 22 of one coupler immediately opposite the end of the key-way in the guide or housing 28 is at a level slightly higher than the bottom of the key-way. Such difference in level may occur because of difficulty in bringing two coupler heads into exact alignment. It also frequently occurs when a coupler of one make is coupled with a coupler of another standard make but of which the relative proportions and dimensions are slightly different. It is an object of this invention to provide a simple key lock or wedge lock so modified as to be more or less universal in its application and capable of locking various standard couplers of the prior art, notwithstanding slight differences in form and proportion.

Figure 2:
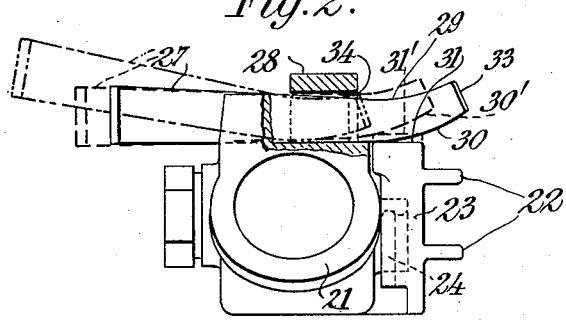
Fig. 2 is an end view of the couplers illustrated in Fig. 1.

To this end, the key or wedge 27 of a lock embodying the invention is provided with a locking end 29 which is bent or gradually inclined upwardly so as to provide a cam-like under surface 30. When the key is in its retracted or "release" position, the end portion of the key assumes a position somewhat higher than and clear of the top surface 31 of the arm 22 of the complementary coupler. Should the surface 31, therefore, be slightly higher than the under surface of the key-way as indicated at 31' in Fig. 2, the key may be driven to a locking position in which its under surface, as indicated in broken lines at 30' in Fig. 2, is in contact with the surface 31'. If the upper surface 31 is in its normal position, that is, in the same plane with the under surface of the key-way, the key may be driven to a locking position indicated in full lines in Fig. 2.

It is a further object of the invention to so design the locking device that the key or wedge may be moved to its "release" position without being free to be disengaged from the boss or housing which forms the guide-way. In the form of the invention herein disclosed, this is accomplished by splitting the ends of the key or wedge as at 32 (Fig. 1) and slightly spreading the outer split portions 33 so as to prevent their withdrawal through the key-way. In order that these outwardly flared portions may not prevent the withdrawal of the key to a position such as will permit the parts of the coupler to be unlocked, the exit end of the boss forming the guide or key-way may be stepped back from the plane of contact between the coupler, of which the key-way forms a part, and the locking arm of the complementary coupler, as indicated at 34, thereby providing a recess to receive the flared end portion of the key when driven to its "release" position.

Figure 3:
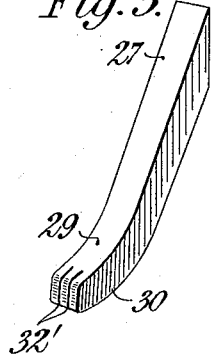
Fig. 3 is a perspective view of a key adapted to form part of the locking device illustrated in Figs. 1 and 2.

Fig. 3 illustrates a key adapted for use as a part of the above-described coupler locking device, the end being split, as at 32', ready to be spread after the key has been inserted in the key-way.

A pair of couplers provided with the above-described locking devices may be readily coupled if the wedges are first moved to their "release" position with their flared end portions in the recess at the exit end of the key-way. After the parts of the coupler heads have been moved to their normal coupled relation, either one of the keys or wedges 27 may be driven to its locked position so as to cause its cam-like portion 30 to be extended over the upper surface 31 of the adjacent arm 22, thereby preventing the accidental disengagement of the couplers. If desired, both of the keys or wedges may be driven to their effective locking positions.

When it is desired to detach the couplers, the keys or wedges may be rendered ineffective by driving them to their "release" position with their flared ends in the recesses at the exit ends of the key-ways, after which the coupler heads may be disengaged. This disengagement of the couplers is facilitated by the slight inclination at the end of the key by which it is most conveniently positioned to be loosened by a slight hammer tap and the flared ends of the keys prevent the latter from being driven clear through and out of the key-ways, thereby preventing them from being lost. This not only materially reduces the cost of replacement, but affords an assurance that the key will always be in position ready to be used as a means whereby the couplers may be locked in their coupled relations without the loss of time in supplying a new key for a lost one.

The invention is not intended to be limited to the specific form herein selected for purposes of illustration but should be regarded as including modifications and variations thereof within the scope of the appended claims.

What is claimed is:

1. A pipe coupler comprising a head having coupling elements whereby it may be coupled with a complementary coupler, said head having a key-way therein, and a key capable of being moved through said key-way to an effective position in which its end may be caused to extend over a portion of the complementary coupler and serve as a coupler locking device, said key being split at its extended end and having portions spread apart to form a stop of gradually increasing width to prevent free withdrawal of the key from the key-way, and an intervening portion adapted to receive a blow of an instrument when the key is to be moved to its "release" position, the exit end of the key-way and the stop at the end of the key being so relatively positioned with respect to other parts of the coupler as to permit the key to be moved to its "release" position before its movement in the key-way is obstructed by the stop.

2. A key for a hose or pipe coupling in the form of a relatively long slightly tapered wedge having its smaller end split into three parts to facilitate spreading the outwardly-disposed parts adjoining the split portion after inserting the key in a key-way to form a stop to prevent detachment by withdrawal, the intervening part being adapted to receive a hammer blow to release the key.

In witness whereof, I have hereunto signed my name.

EDWARD E. GOLD.